US008753554B2

(12) United States Patent
Kumar et al.

(10) Patent No.: US 8,753,554 B2
(45) Date of Patent: Jun. 17, 2014

(54) PELLETIZED LOW MOLECULAR WEIGHT BROMINATED AROMATIC POLYMER COMPOSITIONS

(75) Inventors: Govindarajulu Kumar, Baton Rouge, LA (US); William J. Layman, Jr., Baton Rouge, LA (US); Bo Liu, Nanjing (CN); Douglas W. Luther, Walker, LA (US); Arthur G. Mack, Paririeville, LA (US)

(73) Assignee: Albemarle Corporation, Richmond, VA (US)

( * ) Notice: Subject to any disclaimer, the term of this patent is extended or adjusted under 35 U.S.C. 154(b) by 414 days.

(21) Appl. No.: 13/264,292

(22) PCT Filed: Apr. 29, 2010

(86) PCT No.: PCT/US2010/032932
§ 371 (c)(1),
(2), (4) Date: Oct. 13, 2011

(87) PCT Pub. No.: WO2010/127087
PCT Pub. Date: Nov. 4, 2010

(65) Prior Publication Data
US 2012/0035401 A1 Feb. 9, 2012

Related U.S. Application Data (60) Provisional application No. 61/174,894, filed on May 1, 2009.

(51) Int. Cl.
*C09K 21/00* (2006.01)
*C08J 7/00* (2006.01)
*C07C 22/00* (2006.01)

(52) U.S. Cl.
USPC ............ 264/142; 524/577; 252/601; 570/184

(58) Field of Classification Search
USPC ............ 264/142; 524/577; 252/601; 570/184
See application file for complete search history.

(56) References Cited

U.S. PATENT DOCUMENTS

| 2,243,543 | A | 5/1941 | ter Horst |
| 2,757,146 | A | 7/1956 | Fawcett |
| 2,914,489 | A | 11/1959 | Hall |
| 2,954,412 | A | 9/1960 | Wulf et al. |
| 3,221,068 | A | 11/1965 | Gorham |
| 3,372,880 | A | 3/1968 | O'Hara |
| 3,373,135 | A | 3/1968 | Jenkner et al. |
| 3,451,988 | A | 6/1969 | Langer, Jr. |
| 3,458,586 | A | 7/1969 | Langer, Jr. |
| 3,536,679 | A | 10/1970 | Langer, Jr. |
| 3,541,149 | A | 11/1970 | Langer, Jr. |
| 3,594,396 | A | 7/1971 | Langer, Jr. |
| 3,634,548 | A | 1/1972 | Harwell et al. |
| 3,668,263 | A | 6/1972 | Morrison et al. |
| 3,725,368 | A | 4/1973 | Morrison et al. |
| 3,742,077 | A | 6/1973 | Kamienski et al. |
| 3,751,384 | A | 8/1973 | Langer, Jr. |
| 3,751,501 | A | 8/1973 | Kamienski et al. |
| 3,850,882 | A | 11/1974 | Underwood et al. |
| 3,943,195 | A | 3/1976 | Naarmann et al. |
| 4,041,088 | A | 8/1977 | Bach et al. |
| 4,074,032 | A | 2/1978 | Naarmann et al. |
| 4,078,019 | A | 3/1978 | Langer, Jr. |
| 4,107,231 | A | 8/1978 | Wurmb et al. |
| 4,108,921 | A | 8/1978 | Langer, Jr. |
| 4,129,551 | A | 12/1978 | Rueter et al. |
| 4,129,705 | A | 12/1978 | de Zarauz |
| 4,134,938 | A | 1/1979 | Langer, Jr. |
| 4,137,212 | A | 1/1979 | Theysohn et al. |
| 4,143,221 | A | 3/1979 | Naarmann et al. |
| 4,151,223 | A | 4/1979 | Neuberg et al. |
| 4,200,702 | A | 4/1980 | Gausepohl et al. |
| 4,268,705 | A | 5/1981 | Palmer |
| 4,311,818 | A | 1/1982 | Sigwalt et al. |
| 4,360,455 | A | 11/1982 | Lindenschmidt et al. |
| 4,435,312 | A | 3/1984 | Lecolier et al. |
| 4,450,259 | A | 5/1984 | Roggero et al. |
| 4,463,135 | A | 7/1984 | Maly |
| 4,482,677 | A | 11/1984 | Teranaka et al. |
| 4,535,135 | A | 8/1985 | Lecolier et al. |
| 4,636,540 | A | 1/1987 | Warfel |
| 4,701,498 | A | 10/1987 | Roggero et al. |

(Continued)

FOREIGN PATENT DOCUMENTS

| CN | 100369941 C | 2/2008 |
| DE | 1570376 | 7/1969 |
| DE | 1589700 | 7/1970 |
| DE | 2050009 | 5/1971 |
| DE | 2758781 | 7/1979 |
| DE | 19516563 A1 | 11/1996 |
| EP | 0000141 A1 | 1/1979 |
| EP | 0002514 B2 | 6/1979 |
| EP | 0277429 B1 | 8/1988 |
| EP | 0334715 B1 | 9/1989 |

(Continued)

OTHER PUBLICATIONS

Caplus Abstract of Morton, M., "Homogeneous anionic polymerization. II. Molecular weight of polystyrene initiated by lithium alkyls", Journal of Polymer Science, 1963, Part A-1, pp. 461-474. 1 page.
Caplus Abstract of Narita, T., et al., "Reactivity of butyllithium-MeOCH2CH2OLi System as catalyst for copolymerization of styrene with 1,3-butadiene", Journal of Macromolecular Science, Chemistry, 1970, 4(2), pp. 277-294. 1 page.

(Continued)

*Primary Examiner* — Jafar Parsa
(74) *Attorney, Agent, or Firm* — James A. Jubinsky (57) ABSTRACT

Novel polymer compositions of specified formula are converted into pellets of this invention by process technology provided by this invention. By forming a binder free melt of a polymer of such polymer compositions, and converting the melt into pellets as described here-in, pellets can be formed produce during production, handling, and use, no more than acceptably small amounts of "fines" or air-entrainable dusts.

7 Claims, 1 Drawing Sheet

(56) References Cited

U.S. PATENT DOCUMENTS

| | | | |
|---|---|---|---|
| 4,734,461 A | 3/1988 | Roggero et al. | |
| 4,753,745 A | 6/1988 | Kostusyk et al. | |
| 4,755,573 A | 7/1988 | Aycock | |
| 4,829,135 A | 5/1989 | Gunesin et al. | |
| 4,853,440 A | 8/1989 | Roggero et al. | |
| 4,883,846 A | 11/1989 | Moore et al. | |
| 4,950,721 A | 8/1990 | Dias et al. | |
| 4,975,496 A | 12/1990 | Tigner et al. | |
| 5,112,897 A | 5/1992 | Dever et al. | |
| 5,112,898 A | 5/1992 | Dever et al. | |
| 5,196,622 A | 3/1993 | Pettijohn et al. | |
| 5,198,594 A | 3/1993 | Lillwitz et al. | |
| 5,302,768 A | 4/1994 | Hussain | |
| 5,310,858 A | 5/1994 | Greiner et al. | |
| 5,326,836 A | 7/1994 | Hwang et al. | |
| 5,457,248 A | 10/1995 | Mack et al. | |
| 5,625,017 A | 4/1997 | Morita et al. | |
| 5,637,650 A | 6/1997 | Gill et al. | |
| 5,654,384 A | 8/1997 | Halasa et al. | |
| 5,677,390 A | 10/1997 | Dadgar et al. | |
| 5,686,538 A | 11/1997 | Balhoff et al. | |
| 5,687,090 A | 11/1997 | Chen et al. | |
| 5,728,782 A | 3/1998 | Brady et al. | |
| 5,741,949 A | 4/1998 | Mack | |
| 5,767,203 A | 6/1998 | Ao et al. | |
| 5,852,131 A | 12/1998 | Balhoff et al. | |
| 5,852,132 A | 12/1998 | Dadgar et al. | |
| 5,902,865 A | 5/1999 | Gausepohl et al. | |
| 5,916,978 A | 6/1999 | Ao et al. | |
| 6,008,283 A | 12/1999 | Rose et al. | |
| 6,025,450 A | 2/2000 | Lawson et al. | |
| 6,093,211 A | 7/2000 | Hamielec et al. | |
| 6,133,381 A | 10/2000 | Reed et al. | |
| 6,207,765 B1 | 3/2001 | Ao et al. | |
| 6,232,393 B1 | 5/2001 | Dadgar et al. | |
| 6,232,408 B1 | 5/2001 | Dadgar et al. | |
| 6,235,831 B1 | 5/2001 | Reed et al. | |
| 6,235,844 B1 | 5/2001 | Dadgar et al. | |
| 6,313,230 B1 | 11/2001 | Tsai et al. | |
| 6,326,439 B1 | 12/2001 | Dadgar et al. | |
| 6,348,166 B1 | 2/2002 | Knoll et al. | |
| 6,355,194 B1 | 3/2002 | Agur et al. | |
| 6,362,293 B1 | 3/2002 | Newman et al. | |
| 6,521,714 B2 | 2/2003 | Kolich et al. | |
| 6,657,028 B1 | 12/2003 | Aplin et al. | |
| 6,759,498 B2 | 7/2004 | Ikematsu et al. | |
| 6,767,960 B2 | 7/2004 | Bae et al. | |
| 6,933,343 B2 | 8/2005 | Ikematsu et al. | |
| 7,288,612 B2 | 10/2007 | Desbois et al. | |
| 7,351,777 B2 | 4/2008 | Moore et al. | |
| 7,425,290 B2 | 9/2008 | Semen | |
| 7,632,893 B2 | 12/2009 | Kolich et al. | |
| 2002/0035214 A1 | 3/2002 | Gill et al. | |
| 2002/0183465 A1 | 12/2002 | Babcock et al. | |
| 2005/0143526 A1 | 6/2005 | Faust et al. | |
| 2005/0209408 A1 | 9/2005 | Lee et al. | |
| 2006/0079644 A1 | 4/2006 | Meyer et al. | |
| 2007/0004870 A1 | 1/2007 | Kolich et al. | |
| 2007/0142566 A1 | 6/2007 | Kolich et al. | |
| 2007/0185280 A1 | 8/2007 | Luther | |
| 2007/0232759 A1 | 10/2007 | Chun et al. | |
| 2010/0184941 A1 | 7/2010 | Layman, Jr. et al. | |
| 2012/0041115 A1* | 2/2012 | Kumar et al. | 524/151 |

FOREIGN PATENT DOCUMENTS

| | | |
|---|---|---|
| EP | 0741147 A1 | 11/1996 |
| EP | 0775719 A2 | 5/1997 |
| EP | 0806437 A1 | 11/1997 |
| GB | 1107898 | 3/1968 |
| GB | 1174845 | 12/1969 |
| GB | 1270318 | 4/1972 |
| GB | 1342101 | 12/1973 |
| GB | 1536762 | 12/1978 |
| GB | 1589700 | 5/1981 |
| GB | 2164051 A1 | 3/1986 |
| JP | 59-155454 | 9/1984 |
| JP | 62-042938 A | 2/1987 |
| JP | 08-188622 | 7/1996 |
| JP | 09-249705 A1 | 9/1997 |
| JP | 09-249706 A1 | 9/1997 |
| JP | 10-182730 A1 | 7/1998 |
| JP | 11-043511 A1 | 2/1999 |
| JP | 11-080220 A1 | 3/1999 |
| JP | 11-116613 A1 | 4/1999 |
| JP | 2001-341246 A1 | 12/2001 |
| WO | 90/15095 A1 | 12/1990 |
| WO | 99/25746 A1 | 5/1999 |
| WO | 99/55770 A1 | 11/1999 |
| WO | 00/15678 A1 | 3/2000 |
| WO | 02/072645 A1 | 9/2002 |
| WO | 03/020826 A1 | 3/2003 |
| WO | 2005/118245 A1 | 12/2005 |
| WO | 2007/005233 A1 | 1/2007 |
| WO | 2007/076369 A1 | 7/2007 |
| WO | 2008/011477 A1 | 1/2008 |
| WO | 2008/066970 A1 | 6/2008 |
| WO | 2008/154453 A1 | 12/2008 |
| WO | 2008/154454 A1 | 12/2008 |
| WO | 2009/148464 A1 | 12/2009 |
| WO | 2010/065462 A1 | 6/2010 |
| WO | 2010/065464 A1 | 6/2010 |
| WO | 2010/065467 A1 | 6/2010 |
| WO | 2010/065468 A1 | 6/2010 |
| WO | 2010/127072 A1 | 11/2010 |
| WO | 2010/127087 A1 | 11/2010 |
| WO | 2010/127091 A1 | 11/2010 |

OTHER PUBLICATIONS

Patterman, S. P., et al., "Pi Complexation in Ion Pair Bonding. The Structure of Benzyllithium Triethylenediamine", J. Am. Chem. Soc., 1970, 92:5, pp. 1150-1157.

Pines, H., et al., "Sodium-catalyzed side chain aralkylation of alkylbenzenes with Styrene", J. Am. Chem. Soc, 1958, vol. 80(22), pp. 6001-6004.

Pines, H., et al., "Sodium Catalyzed Reactions. II. Side-chain Ethylation of Alkyl Aromatic Hydrocarbons Catalyzed by Sodium", J. Am. Chem. Soc., 1955, vol. 77(3), pp. 554-559.

Reed, J. N., "Product Subclass 13: Benzyllithium Compounds and (Lithiomethyl)Hetarenes", Science of Synthesis, 2006 (vol date 2005), vol. 8A, pp. 329-355.

Seki, A., et al., "Crossed aldol reaction using cross-linked polymer-bound lithium dialkylamide", Tetrahedron, 2004, vol. 60, pp. 5001-5011.

Sorenson, W. R., et al., Preparative Methods of Polymer Chemistry, Interscience Publishers, Inc., 1961, pp. 198-200.

Strohmann, C., et al., "A Highly Diastereomerically Enriched Benzyllithium Compound: The Molecular Structure and the Stereochemical Course of Its Transformations", Organometallics, 2002, vol. 21, pp. 3079-3081.

Tsukahara, Y., et al., "Preparation and Characterization of alpha-benzyl-omega-vinylbenzyl Polystyrene Macromonomer", Polymer Journal, 1994, vol. 26, No. 9, pp. 1013-1018.

Caplus Abstract of Waack, R., et al., "Effects of lithium halides on the reactivity of organolithium compounds (in polymerization)", Chemistry & Industry, 1964, vol. 12, pp. 496-497. 1 page.

Waack, R., et al., "Reactivities of Organolithium Compounds in Tetrahydrofuran. I. As Vinyl Polymerization Initiators", J. Org. Chem., 1967, 32(11), pp. 3395-3399.

Wilhelm, D., et al., "Reactions of Polyanions Derived from Alkylbenzenes", J. Am. Chem. Soc., 1984, 106, pp. 361-367.

DIC Corporation, Epoxy Resins, Brominated Flame Retardant Pratherm, from website http://www.dic.co.jp/en/products/epoxy/pratherm.html, 1 page, Aug. 2010.

Eberhardt, G. G., et al., "A Catalytic Telomerization Reaction of Ethylene with Aromatic Hydrocarbons", J. Org. Chem., vol. 29, 1964, pp. 2928-2932.

(56) References Cited

OTHER PUBLICATIONS

Eberhardt, G. G., et al., "Telomerization Reactions Involving a N-Chelated Organo Lithium Catalyst", Polymer Preprints, 1972, vol. 13, pp. 667-671.

Feil, F., et al., "Benzyl Complexes of the Heavier Alkaline-Earth Metals: The First Crystal Structure of a Dibenzylstrontium Complex", Organometallics, 2001, vol. 20, pp. 4616-4622.

Caplus Abstract of Fujimoto, T., et al., "Preparation of monodisperse polystyrenes with high molecular weights", Polymer Journal, 1975, 7(3), pp. 397-401. 1 page.

Gatzke, A.L., "Chain Transfer in Anionic Polymerization. Determination of Chain-Transfer Constants by Using Carbon-14-Labeled Chain Transfer Agents", Journal of Polymer Science, Part A-1, 1969, vol. 7, pp. 2281-2292.

Science Direct Abstract of Helary, G., et al., "Etude de la polymerisation anionique du styrene en milieu non polaire, en presence de N,N,N',N' tetramethyl ethylene diamine", European Polymer Journal, 1978, vol. 14, issue 5, pp. 345-348. 1 page.

Hennion, G. F., et al., "The Polybromination of Alkylbenzenes", J. Am. Chem. Soc., 1946, vol. 68, issue 3, pp. 424-426.

Caplus Abstract of Ito, M., et al., "Synthesis of well-defined block copolymers containing poly(N-isopropylacrylamide) segment by anionic block copolymerization of N-methoxymethyl-N-isopropylacrylamide", Designed Monomers and Polymers, 2004, 7(1-2), pp. 11-24. 1 page.

Junkui, C., "Synthesis of Narrow Distribution Polystyrene in RLi-Ligand Complex Systems", Chemical Journal of Chinese Universities, 1989, vol. 10, No. 12, pp. 1246-1250. Abstract only translated.

CAPLUS Abstract of Kalnins, K., et al., "Electronic structure of complexes of benzyl anion and ion pairs with styrene", Vysokimolekulyarnye Soedineniya, Seriya A (1990), 32(2), 316-21. 1 page.

Lamneck, Jr., J. H., "Bromination of the Two Propylbenzenes and Three Butylbenzenes", J. Am. Chem. Soc., 1954, vol. 76, issue 4, pp. 1106-1107.

CAPLUS Abstract of Langer, A. W., Jr., "Reactions of Chelated Organolithium Compounds", Transactions of the New York Academy of Sciences, 1965, 27(7), pp. 741-747. 1 page.

Marechal, Jean-Marc, et al., "Stereoregulation in the anionic polymerization of styrene initiated by superbases", Polymer, 2003, vol. 44, pp. 7601-7607.

Marechal, Jean-Marc, et al., "Stereospecific anionic polymerization of styrene initiated by R2Mg/ROMt 'ate' complexes", Polymer, 2004, 45, pp. 4641-4646.

Maruoka, K., et al., "Novel Anionic Oligomerization by a New, Sequential Generation of Organolithium Compounds", Macromolecules, 1996, 29, pp. 3328-3329.

Milner, R., et al., "Anionic telomerization of butadiene with toluene and diphenylmethane: microstructure and molecular weight", Polymer, vol. 26, 1985, pp. 1265-1267.

Mizuno, T., et al., "Second and Third Virial Coefficients of Polystyrene with Benzyl Ends near the Theta Point", Macromolecules, 2005, 38, pp. 4432-4437.

Advanced Organic Chemistry, Reactions, Mechanisms, and Structure, 4th Ed., Jerry Mar., J. Wiley & Sons, 1992, pp. 743-744.

Atkins, Physical Chemistry, P. W., 4th Ed., W. H. Freeman and Co., 1990, p. 800.

Baskaran, D., et al., "Effect of Chelation of the Lithium Cation on the Anionic Polymerization of Methyl Methacrylate Using Organolithium Initiators", Macromolecules, 1995, 28, pp. 7315-7317.

Bildmann, U. J., et al., "Synthesis and Structure of the Tmeda Adduct of a Dibenzyl Lithiate Anion Containing Four-Coordinate Lithium", Organometallics, 2001, 20, pp. 1689-1691.

CAPLUS Abstract of Chakrapani, S., et al., "Strategies for the controlled, living anionic polymerization of acrylic and methacrylic monomers and novel star polymers", Polymer Science, 1994, vol. 1, pp. 112-117. 1 page.

Concise, Polymeric Materials Encyclopedia, Editor-in-Chief, Joseph C. Salamone, CRC Press, 1999, pp. 1305-1307.

* cited by examiner

Fig. 1

PELLETIZED LOW MOLECULAR WEIGHT BROMINATED AROMATIC POLYMER COMPOSITIONS

REFERENCE TO RELATED APPLICATIONS

This application is the National Stage of International Patent Appl. No. PCT/US2010/032932 filed on Apr. 29, 2010, which in turn claims the benefit of U.S. Provisional Patent Appl. No. 61/174,894, filed on May 1, 2009, the disclosures of which are incorporated herein by reference.

BACKGROUND

A new highly-effective class of low molecular weight brominated aromatic polymer compositions has recently been discovered in our laboratories. These compositions have the formula:

wherein n is an average number in the range of about 2.9 to about 3.9, wherein each x is the same or different and is a whole number in the range of 3 to 5, the average number of all of the x's in the composition being in the range of about 3.50 to about 3.80 and the weight percent of bromine as determined by X-Ray Fluorescence Spectroscopy (XRF) in the polymer being in the range of about 73.4 to about 74.5. A detailed description of these new brominated aromatic polymer compositions and their preparation and uses is presented in commonly-owned Provisional U.S. Patent Application No. 61/119,289, filed Dec. 2, 2008, all disclosure of which is incorporated herein by reference.

Because of the relatively low molecular weights of the polymers of the above formula (e.g., an $M_w$ in the range of about 3000), it would not be expected that the above low molecular weight brominated aromatic polymer compositions would have sufficient intrinsic strength to be directly converted into pellets without co-formation of considerable amounts of powdery co-product, including powders in the form of dusts. Dust and powder formation is of course very undesirable, especially if the dusts become entrained in the air. Moreover, unless the dusts and powders are recovered for recycle, their formation would result in loss of desirable product and consequent economic loss.

The expectation that the above relatively low molecular weight polymers would not be expected to have sufficient intrinsic strength to be directly converted into pellets without co-formation of considerable amounts of powdery co-product, including powders in the form of dusts is based on actual experience in our laboratories. As pointed out in commonly-owned WO 2008/011477, anionic styrenic polymers such as anionic polystyrene, a polystyrene formed by use of an anionic polymerization inhibitor system, have "a propensity to form substantial amounts of small particles and powders when attempts are made to pelletize the product. It appears that the pellets, unless bound together by an extraneous binding agent or the like, tend during formation, handling, and/or packaging to break apart and to revert to small particles and finely-divided powder, typically referred to as "fines". Because of this characteristic, various conventional pelletizing or compacting procedures are unsuitable for producing brominated anionic styrenic polymers essentially free of fines and that during shipment and handling remain essentially free of fines. As can be readily appreciated, the existence or formation of fines in a product of this type is not only detrimental to the appearance of the pelletized product but in addition is undesired by the consumer."

In as much as the foregoing quotation applies to a type of polymer having molecular weights ($M_w$) typically in the region of about 13,000, it can be seen that with a polymer having an $M_w$ in the region of about 3000, the expectation would be that useful pellets could not be made without a binder and even if a binder were used, the amount of such binder in a pelletized product would necessarily be relatively high in order to keep the amount of fines and dust particles to a satisfactory minimum.

Indeed, it would be of considerable advantage if a way could be found of converting powdery polymers of the type referred to above into pellets which, even if susceptible to breakup during handling or use, would form smaller aggregates with little, if any, co-formation of air-entrainable dusts.

BRIEF NON-LIMITING SUMMARY OF THE INVENTION

Contrary to such expectations, it has been found, surprisingly, that polymers of formula (I) below can be converted into pellets by process technology provided by this invention. More particularly, it has been found that by forming a melt consisting of a melt of a polymer composition of formula (I) below, and converting the melt into pellets as described herein, it is possible to achieve the formation of pellets which produce during production, handling, and use, acceptably small amount of "fines" or air-entrainable dusts. As will be seen from experimental data presented hereinafter, it has been found possible pursuant to this invention to form pellets which when subjected to a Tumbling Attrition Test, formed only 4.2 wt % of fines.

Provided by this invention are essentially non-dusting off-white pellets which are environmentally friendly, recyclable, and melt blendable. The pellets have a bromine content ≥70 wt %. In addition, the pellets of this invention are deemed to have good overall mechanical properties, good thermal stability, good color stability, and good flame retardant efficiency. The above and other features, characteristics, and advantages of this invention will become still further apparent from the ensuing description, accompanying drawings, and appended claims.

FURTHER DETAILED DESCRIPTION OF THE INVENTION

This invention provides, among other things, a process for pelletizing a brominated aromatic polymer composition of formula (I) below, which process comprises forming a binder free flowing melt from a brominated aromatic polymer composition of formula (I) depicted and as described below (hereinafter often referred to as "BAPC" in the singular and "BAPC's" in the plural), and converting such flowing melt into solidified pellets, the process being characterized in that during the process of pelletization, formation of finely divided particles is suppressed and formation of air-entrainable dust is reduced at least to acceptably small levels, and the pellets are characterized in that, if susceptible to breakup during handling or use, smaller granules are formed accompanied by acceptably small amounts of air-entrainable dusts.

In other words, during pellet formation, pellet handling, and pellet usage, the pellets are not accompanied by, or result in formation of, unacceptable quantities of air-entrainable dusts, even though some smaller granules may be formed.

When utilized in forming the flowing melt, the BAPC can be in various forms such as small grains or granules, but typically it is in the form of a powder.

Among desirable methods for producing pellets pursuant to this invention, is a process as described above in which the conversion of BAPC into a flowing melt is conducted at an elevated temperature in an operating continuous extrusion device such as a twin screw extruder, and wherein the extrudate from the extruder is pelletized before or after the extrudate solidifies or is solidified. Use of pelletizing equipment as described in U.S. Patent Application Publication 2007/0185280, published Aug. 9, 2007, has been found to be an effective way of producing pellets of this invention having the low dust properties.

Another desirable process for producing pellets pursuant to this invention is a process as described above in which a solution or slurry of extrudable viscosity formed from a BAPC and a solvent is converted in a devolatilization extruder (hereinafter often referred to as "devol extruder") operating at an elevated temperature into a flowing melt, and wherein the extrudate from the devol extruder is pelletized before or after the extrudate solidifies or is solidified. In conducting such a process, it is particularly desirable not only to effect the conversion of BAPC into a flowing melt by use of a devol extruder, but additionally to recover the solvent that is vaporized from the solution or slurry. Whether or not solvent recovery is utilized, the amount of BAPC in the solution or slurry is typically in the range of about 40 to about 80 wt %, and the extrudate from the devol extruder is pelletized before or after the extrudate solidifies or is solidified. Use of pelletizing equipment as described in International Publication Number WO 2008/011477, published Jan. 24, 2008, is an effective way of producing pellets of this invention having the low dust properties.

In the pelletization methods of this invention, a "flowing melt" or a term of similar meaning such as "polymer flow" is referred to. As used herein, including the claims, such terms refer to the fact that the BAPC, when in operating extrusion devices such as single or twin screw extruders, cross head extruders, devol extruders, etc., becomes a melted mass and/or a sufficiently softened mass that will thenceforth proceed (i.e., flow) through the remainder of the device (including any extension that may be added thereto) and a die disposed at the discharge end of the machine under the thrust provided within the machine by the screw(s) thereof. It matters not whether, strictly speaking, a true melt has been formed or whether the BAPC has merely been softened to such an extent that it will be caused to flow as just indicated.

Also provided by this invention is a pelletized binder-free flame retardant composition in which essentially the only component of the pellets is BAPC of the formula:

(I)

wherein n is an average number in the range of about 2.9 to about 3.9 (which when rounded off to whole numbers, becomes an average number in the range of about 3 to about 4), wherein each x is the same or different and is a whole number in the range of 3 to 5, the average number of all of the x's in the composition being in the range of about 3.50 to about 3.80 and the weight percent of bromine as determined by X-Ray Fluorescence Spectroscopy (XRF) in the polymer being in the range of about 73.4 to about 74.5. The BAPC may contain trace amounts of brominated toluene, typically in the range of about 400 ppm (wt/wt) to below the detection limit of about 20 ppm (wt/wt), and of brominated 1,3-diphenyl-propane, typically in the range of about 0.2 to about 1.0 wt %.

It will be appreciated that formula (I) above is the same as the formula presented at the outset of this disclosure, except that formula (I) above is in an expanded form which illustrates the bonding among the groups in the molecule. It is to be understood that neither formula (I) above nor formula (II) hereinafter is intended to represent the actual spatial configuration of the molecules. Rather, the depiction of these formulas is merely for the purpose of facilitating an understanding of the composition of the molecules.

BAPC's and Their Precursors

The BAPC's constitute essentially the entire component of the blends which are pelletized pursuant to this invention.

To date, the only known method for producing these novel BAPC's is to brominate an aromatic polymer composition, i.e., a distribution of low molecular weight styrene polymers of the formula:

(II)

wherein n is an average number in the range of about 2.9 to about 3.9 with the proviso that 1,3-diphenylpropane, a compound of formula (II) in which n is 0, optionally is present in this distribution in an amount of not more than about 1 GPC area %, and with the further proviso that this distribution optionally further contains toluene in an amount of not more than about 0.1 GPC area %, and wherein this distribution is further characterized by having an $M_w$ in the range of about 650 to about 750, an $M_n$ in the range of about 500 to about 600, an $M_z$ in the range of about 830 to about 1120, and a polydispersity in the range of about 1.2 to about 1.35.

It will be noted from formula (II) that the aromatic polymer compositions possess a characteristic phenethyl end group in their molecular structure. For convenience, aromatic polymer compositions of formula (II) depicted and described above are often referred to hereinafter in the singular as "APC" and in the plural as "APC's".

Presented below are further details concerning the preparation of the APC's of formula (II) and thereafter bromination of an APC to form a BAPC of formula (I). The APC's of formula (II) thus constitute the precursors for the BAPC's of formula (I).

APC's

To prepare the APC's of formula (II) above, styrene is fed into an agitated reaction mixture formed from components comprising toluene, alkyllithium, and N,N,N',N'-tetramethylethylenediamine (TMEDA), at rates of (i) moles of styrene/moles of toluene/hour in the range of about 0.3 to about 1.5 and (ii) moles of styrene/moles of alkyllithium/hour in the range of about 40 to about 110. The molar ratio of styrene:toluene is in the range of about 0.75 to about 4, the molar ratio of styrene:alkyllithium is in the range of about 150 to about 350, and the molar ratio of TMEDA:alkyllithium is in the range of about 2.2 to about 8. The temperature of the reaction mixture is maintained in the range of about 70° C. to about 90° C., and desirably in the range of about 78° C. to about 81° C.; the agitation being at least sufficient to maintain a substantially homogeneous concentration profile in the reaction mixture. Upon completion of the reaction, as indicated, for example, by rapid reduction in the process temperature at constant heat flux, the reaction mixture is quenched, typically at a temperature of below about 80° C. The quenching is effected using a protic solvent which, (i) if water is the quenching solvent, at least one phase cut is made to separate the organic and aqueous phases, and (ii) if a quenching solvent other than water is used, wash water is added to extract the quenching solvent and form an organic phase and an aqueous phase which are then separated by a phase cut. The TMEDA and unreacted toluene are separated and recovered from the reaction mixture, typically by distillation or a stripping operation, whereby the last traces of water are also removed azeotropically from the reaction mixture. Preferably, the TMEDA-toluene mixture is recovered and recycled to the reaction after drying by conventional means, which include passing through molecular sieves or by refluxing under a sparge of dry nitrogen, or any other method which preferably does not remove the TMEDA from the toluene. If the method happens to remove the TMEDA, it is desirable from a process economics standpoint to recover and recycle the TMEDA as well as the toluene. In the quenching operation and washings thereafter, use of deoxygenated water is especially desirable because it suppresses formation of color bodies in the distribution of styrene polymers. Formation of such color bodies is very undesirable in as much as the amount of such color bodies can continuously increase as the commercial production unit reaches steady-state production. A commercial plant facility can be operated either on a batch, semi-batch, or continuous mode using balanced feeds as described above.

In conducting the above processing it is desirable to ensure that the reagents in the reaction mixture are uniformly dispersed. Thus, the combination of significant agitation and dispersive mixing of the reagents in the reaction mixture is utilized. The agitation and mixing used should be at least sufficient to maintain a substantially homogeneous concentration profile in the reaction mixture. That is to say, that concentration gradients of all reagents in the total volume of the reaction mixture should be at a minimum such that there is no one discrete reaction zone (i.e., locally high concentrations of any such reagent are at a minimum). As a consequence of this, the complementary reaction kinetics of chain transfer and chain propagation occur uniformly throughout the entire volume of the reaction mixture, thereby providing the uniform molecular weight distributions achieved in the practice of this process technology. In doing so, competing undesirable side reactions which would lead to catalyst inefficiencies and formation of impurities are essentially eliminated.

At this stage of the overall process of forming APC's, the residual reaction product from the workup conducted up to this stage is a crude reaction product requiring further treatment.

The crude reaction mixture comprising a styrene polymer distribution remaining after the separation operation referred to above is then subjected to a selective purification operation which ensures that the content of 1,3-diphenylpropane, if any, is not more than about 1 GPC area % and that the content of free toluene, if any, in the styrene polymer distribution is less than about 0.1 GPC area %. In addition, this operation should yield a product having an $M_w$ in the range of about 650 to about 750, an Mn in the range of about 500 to about 600, an $M_z$ in the range of about 830 to about 1120, and a polydispersity in the range of about 1.2 to about 1.35. Because of the low-molecular weights and the viscous and thermal characteristics of the crude reaction mixture, this selective purification is typically conducted using wiped film evaporation. Use of one or two passes through a suitable wiped film evaporator is usually sufficient to achieve these desired specifications for the aromatic polymer compositions used as the substrates in the bromination reaction without degradation of the APC which remains as the desired product of this overall operation.

Bromination of APC's to Form BAPC's

Any known method for bromination of aromatic hydrocarbons may be employed for preparing the BAPC's which are pelletized pursuant to this invention. In general, aromatic brominations are conducted in the absence of light and preferably use elemental bromine as the brominating agent. The bromination is carried out under anhydrous conditions, using a suitable Lewis acid catalyst such as an aluminum halide or ferric halide catalyst. To minimize bromination on aliphatic carbon atoms, the reaction is preferably conducted at temperatures below about 25° C. A bromination solvent is typically used in the process.

Successfully used in the practice of this invention was a bromination process which involved brominating an APC with bromine as the brominating agent in the presence of a catalytic amount of an aluminum halide bromination catalyst and a solvent and wherein at least substantially all of the bromination occurs at a temperature within the range of from about −10° C. to about 0° C. to form a composition having a bromine content as determined by XRF in the range of about 73.4 to about 74.5.

Desirably, the initial form of the aluminum halide catalyst used in the above bromination process is as $AlCl_3$ or $AlBr_3$. However, a mixture of these can be used if desired. The $AlCl_3$ is desirably slurried in a suitable diluent. Alternatively, $AlCl_3$ can be reacted by means of chloride-bromide exchange (trans-halogenation) to produce a mixed or partially mixed chlorobromo aluminum trihalide with improved solubility in the liquid diluent. When $AlBr_3$ is used, it is desirable to predissolve it in bromine. The bromination processes can be conducted as a batch, semi-batch or as a continuous process.

Generally speaking, preferred bromination processes used for forming the BAPC's can be additionally characterized by having the APC fed to a reactor as a solute in proximity to and contemporaneously with joint or separate feed(s) to the reactor of the brominating agent and the aluminum halide catalyst. These feeds desirably occur subsurface to the liquid contents of the reactor (usually a liquid solvent heel at feed initiation and the crude reaction mass after feeding has been initiated) and such feeds form, with the initial reactor contents, a crude reaction mass at least comprising a BAPC, aluminum halide catalyst, and solvent. The crude reaction mass can also contain unreacted brominating agent. Another class of impurity that will likely be present is N-bromoamines, which are suspected to give rise to undesirable color bodies and thermally labile bromine. These N-bromoamines would form from amine components or impurities suspected to be present in aromatic polymer compositions as derivatives from the chain transfer polymerization promoter, TMEDA.

The solvent chosen for the feed of the APC is preferably the same as the solvent that is pre-charged to the reactor before feeding begins.

The solvent used with the APC's and reactor pre-charges can be selected from any of the following exemplary solvents; dichloromethane, dibromomethane, bromochloromethane, bromotrichloromethane, chloroform, 1,2-dibromoethane, 1,1-dibromoethane, 1-bromo-2-chloroethane, 1,2-dichloroethane, 1,1,2-tribromoethane, 1,1,2,2-tetrabromoethane, 1,2-dibromopropane, 1-bromo-3-chloropropane, 1-bromobutane, 2-bromobutane, 2-bromo-2-methylpropane, 1-bromopentane, 1,5-dibromopentane, 1-bromo-2-methylbutane, 1-bromohexane, 1-bromoheptane, bromocyclohexane, and liquid isomers, homologs, or analogs thereof and mixtures of any two or more of the foregoing. Preferred solvents are dichloromethane, dibromomethane, and 1,2-dichloroethane. Bromochloromethane is a particularly preferred solvent.

Whatever solvent is chosen, it is important to ensure that it is relatively free of water. Water in the reaction system during bromination will affect catalytic activity of the aluminum halide catalyst as is well recognized in the art. Generally, it is best that the solvent contain less than about 50 ppm (wt/wt) water. In regard to water, all reactants should be dry. The brominating agent, e.g. bromine, should not contain more than about 30 ppm water. The aromatic polymer compositions should also be sufficiently dry so as to not introduce deleterious amounts of water into the bromination.

The amount of solvent in the feed of the aromatic polymer compositions is that amount which at least enables the formation of a free-flowing, low-viscosity solution. In cases where the APC is in the liquid state, consideration for using a solvent-free feed of the APC can be given. However, it has been found that the use of a solvent is preferred as it helps dilute the feed of the APC so that efficient bromination can occur in the reaction mass. Generally, when the solvent is bromochloromethane, from about 60 to about 80 wt % (preferably from about 65 to about 75 wt %) of the feed of the APC's will be solvent. It is advantageous to remove polar species from such APC solutions prior to bromination. This is accomplished by treating the APC-bromination solvent solution with a solid absorbent that does not introduce into the solution, or catalyze the formation in the solution, of unacceptable amounts of impurities. Such treatment results in enhanced thermal HBr stability at temperatures as high as 320° C. Acidic aluminum oxide is one example of such an absorbent. Other suitable absorbents that do not introduce or catalyze formation of an unacceptable amount of impurities include, for example, the acidic forms of Amberlyst® or Amberlyte® resins (Rohm & Haas Company), and the acidic forms of Dowex® resins (The Dow Chemical Company). Also suitable are high surface silica gel, neutral and basic forms of aluminum oxide, and certain acidic zeolites.

The pre-charge of solvent to the reactor prior to the reactant and catalysts feeds is that amount which will provide a sufficient mass to provide an adequate heat sink to disperse the heat of the bromination reaction combined with the heat of solution of the by-product HBr so that a "heat kick" or temperature spike is minimized in the proximity of the above mentioned feeds. To this end, it is also preferred that the crude reactor contents/crude reaction mass be stirred to promote thermal and mass uniformity therein. Use of a heel from a previous run already saturated with HBr reduces the initial demand on the cooling system of the reactor and for that reason is preferred in some commercial configurations.

The aluminum halide solvent can be fed to the reactor separate from the brominating agent feed. However, such a separated feeding scheme is not preferred. Process simplicity dictates that the brominating agent be bromine and that the aluminum halide solvent and the bromine be fed as a single feed. $AlBr_3$ readily dissolves in bromine. $AlCl_3$ can be dispersed or slurried in bromine. The amount of $AlBr_3$ fed, whether separately or in combination with the bromine feed, is a catalytic amount sufficient to provide from about 0.3 to about 1 mole % $AlBr_3$ per mole of bromine fed as calculated using the equation:

Mole % $AlBr_3$=(weight of $AlBr_3$/266.7÷weight of Bromine/159.81)×100

The amount of bromine fed is that amount required to achieve the desired bromination level sought assuming some small loss of bromine overhead with by-product HBr. Thus, for example, when desiring to obtain a bromine content of about 73.4 to about 74.5 wt %, about 3.5 to about 3.8 moles of bromine are fed per mole of phenyl group present. The moles of phenyl group present for the styrene polymer (III)

(III)

is given by the following:

Mole phenyl/mole styrene polymer=$2+n_{average}$=$2+[(M_n-196.29)/104.15]$.

Alternatively and more conveniently one can simply charge bromine based on the equations below:
a) wt Br=wt % Br·wt $APC_{brominated}$
b) wt $APC_{brominated}$≈wt $APC_{unbrominated}$(1−wt % Br)
Note: In b), the approximation is the result of ignoring the small amount of mass not accounted for the protons substituted by bromine.

Thus wt Br≈wt % Br·[wt $APC_{unbrominated}$/(1−wt % Br)]

and d) Moles bromine=2·wt Br/159.81
e) Moles bromine≈2·wt % Br*[wt $APC_{unbrominated}$/(1−wt % Br)]/159.81

It is preferred to feed, as close as is possible, just the amount of bromine needed to obtain the wt % bromine desired. If, excess bromine is fed, then at least some of that excess will be in the crude reaction mass and should be removed in down-stream finishing steps.

Whatever the reason for the presence of excess bromine in the crude reaction mass, conventional techniques recognized in the art to remove such excess bromine can be used, e.g., using a reducing agent such as sodium sulfite, to convert the bromine to water soluble bromide salts. However, it has been observed that the use such reducing agents tends to encourage the formation of an emulsion and/or rag during some of the down-stream finishing steps. Such, emulsion or rag layer causes separation difficulties and process inefficiencies.

The APC, brominating agent, and aluminum halide feeds such as $AlBr_3$ should be made beneath the surface of the reactor contents/reaction mass and in close proximity to each other. The bromination of the APC's should occur quickly. The rates of reaction for these brominations are very fast due to reaction kinetics. Thus, the rate-determining factor is the rate of mass transfer. Hence, the use of proximate feeds is designed so that the reactants and catalyst are close, one to the other. Another factor that can ensure fast bromination is to use a feed of $AlBr_3$ in solution with bromine. It is believed that the bromine preconditions the $AlBr_3$ to the active catalyst state so that the catalyst is active when first fed. One technique to ensure close proximity of the feeds is to provide that the feed tubes into the reactor contents/reaction mass be held together so that they discharge in adjacent parallel or in direct, impinging directions.

Having the feeds discharge beneath the reactor content/crude reaction mass liquid levels is beneficial as it ensures that there is heat dissipation away from the feeding area. Having a "hot spot" at the feeding area is to be avoided to the extent commercially possible. Again, stirring of the reactor contents/crude reaction mass also aids in heat dispersion.

The amount of solvent pre-charge to the reactor should be that amount necessary to accomplish the heat dissipation function without burdening the process with higher than needed material handling expenses.

The feed rate of the individual feeds should be as high as is possible considering the reactor size and design, the heat that is to be handled and the cooling available to assist in heat management, the feeding apparatus available and the ability to safely handle HBr by-product gas. The higher the possible feed rates, the more efficient the process.

During the co-feed, the reactor contents/crude reaction mass should be kept at a temperature within the range of from about $-20°$ C. to about $5°$ C. and preferably within the range of from about $-20°$ C. to about $5°$ C., and more usually in the range of $-10°$ C. to about $0°$ C. until substantially all the bromination has occurred. The feeds to the reactor are conveniently fed at about ambient temperature. To obtain the reactor contents/crude reaction mass temperatures mentioned above, the reactor is provided with adequate cooling. The temperature should be measured as close to the feed area as is practical.

The pressure in the reactor during the bromination is not critical, super-atmospheric pressures being the norm. However, very high pressures are not preferred in the context of equipment requirements and safety issues. Autogenous pressures are permissible.

Subsequent to the reactant and catalyst feeds, it is permissible to allow the reaction mass to experience a ride time to ensure that bromination has ceased. It is permissible, when brominating at about 74 wt % bromine, to allow the temperature to warm to about $7°$ C. to help facilitate consumption and react out as much of the fed bromine as is practical. This is particularly desirable where the practitioner decides to forgo the use of a bromine reducing agent during the initial aqueous quench so as to avoid any emulsion and rag layer difficulties.

After the feeds are completed and the ride time, if any, has passed, the crude reaction mass is removed from the reactor and quenched in water. As mentioned previously, if the crude reaction mass or, for that matter, any organic phase that is treated down-stream of the bromination, contains unreacted bromine, such bromine content can be lowered or eliminated by the use of a reducing agent to convert the bromine to water soluble bromide. But again, the use of such reducing agents, particularly the sulfites can cause emulsion formation, and can lead to a product with a higher $\Delta E$ value in the Hunter Solution Color Value Test. Therefore, it is recommended to not use bisulfite or sulfite, or any other sulfur-based bromine reducing agent.

The quench is conveniently performed at ambient temperature and generally speaking no heating other than the heat of solution of residual HBr is needed to effect a phase separation. Since bromine and other active brominating species can be present it is preferred to minimize heating of the mixture and to limit exposure to visible light. This assists, to some extent, in helping to ensure a low thermally labile bromine content.

The water quench does not have a ride time as the deactivation of the $AlBr_3$ and the reduction of bromine is nearly instantaneous as the crude reaction mass is fed to the quench water or quench water reducing agent solution. Once the quench is complete, two defined phases are formed, an aqueous phase and an organic phase. The organic phase contains solvent and the BAPC, and will require further treatment.

After the water quench and phase separation and any additional bromine removal steps (water extraction or distillation) are complete, it is desirable to wash the organic phase with a basic sodium borohydride solution. The borohydride and its borane by-products act to convert available active bromine species, including available unreacted brominating agent, e.g., bromine (if any should still be present), and any available derivatives formed from the unreacted brominating agent (e.g., hypobromites, and/or hypobromous acid) and also any available N-bromoamines, so that the bromine and active bromine species are reduced to bromide, and in the case of the N-bromides, this material is reduced to sodium bromide and free amine. Thus, the use of sodium borohydride has a primary function, i.e., to reduce the amount of N-bromoamines present, and a secondary function, i.e., the reduction of any amount of bromine present. Thus, quantitatively, the amount of sodium borohydride used is that amount necessary to handle both functions. As used in this paragraph, the term "available", as used in connection with active bromine species, unreacted brominating agent, derivatives formed from the unreacted brominating agent, and N-bromoamines, denotes that the identified materials are not occluded within solids to such an extent that they cannot be removed simply by contact with the sodium borohydride solution.

As the caustic aqueous sodium borohydride solution is used to treat the organic phase, an aqueous phase is formed. The pH of the sodium borohydride solution is such that the formed aqueous phase has a pH between about 10 and about 14 throughout the period that the formed aqueous phase is in contact with the organic phase.

Usually, but not necessarily, the sodium borohydride content of the treating solution is within the range of from about 0.05 to about 1.0 wt % sodium borohydride, based on the total weight of the treating solution.

An important feature of the caustic sodium borohydride step is that a temperature above about $45°$ C. and preferably within the range of from about $54°$ C. to about $62°$ C. at one atmosphere is maintained during the treatment period. Experimentation has shown that room temperature does not obtain the high attenuation of N-bromoamine derived color bodies and thermally labile bromine that higher temperatures obtain.

The treatment temperature is maintained for at least that amount of time needed to obtain the benefits of the treatment, generally at least about 30 minutes has deemed to be more than sufficient. The practitioner can choose a lesser amount or a greater amount of time as needed. Generally, experimentation has shown that the organic phase and aqueous mixture (during treatment, mixing is provided) will noticeably begin to thin at about 45° C. to 50° C. It is theorized that the N-bromides and any N-sulfides and/or N-oxides species present are quaternary and hence charged species or at least highly polar species. Such species are implicated in the thickening of the intimately mixed organic and basic aqueous phase. This is observed in an increased draw on the agitator drive used in the mixing. At a temperature above 45° C. and closer to 54° C. such thickening is eliminated and the draw on the drive is reduced. At temperatures below 45° C., thickening occurs and at times incomplete phase separation is observed. Once higher temperatures are achieved, the thickening phenomenon is eliminated, and phase separation is nearly instantaneous, especially when temperatures in excess of 54° C. are used.

The use of the above described aqueous caustic sodium borohydride treatment or wash can be used at any time after the water quench step and phase separation and on any recovered organic phase in the down stream, finishing sequence.

It is preferred to avoid substantial heating of the organic phase prior to the sodium borohydride treatment. Hence temperatures below 35° C. are preferred prior to the borohydride treatment.

After the final washing, the organic phase is separated from the aqueous phase and fed to hot water, say from about 90° C. to about 100° C., to flash off the solvent present and to yield solids in the aqueous phase. Temperature maintenance can be achieved by keeping the water at reflux temperature. This flashing off technique is well known in the art of producing brominated polystyrenics.

Once the solvent has been flashed off, the solids are separated from the water by conventional means, e.g., filtration and the like. The separated solids are then dried by conventional drying techniques, again keeping in mind the $T_g$ of the solids. The dried solids are the finished BAPC's suitable for use in the pelletization process of this invention.

Another method that may be useful when dealing with low $T_g$ polymers, is to send the organic phase (after azeotropic drying to prevent corrosion issues) to a wiped film evaporator, a falling film evaporator, a continuous strip kettle or a devol extruder where solvent can be rapidly removed and the resulting viscous melt can be easily manipulated and then pelletized pursuant to this invention.

Whether devolatilization is conducted by means of precipitation or by means of wiped film evaporator, a falling film evaporator, a continuous strip kettle or a devol extruder, it is preferred to filter the azeotropically dried solution through activated acidic aluminum oxide. It has been found that about 1-5 parts by weight of aluminum oxide per 100 parts by weight of dissolved (contained) BAPC is sufficient to remove impurities that contribute to reduced thermal color stability.

The foregoing bromination and work-up procedures enable the preparation of the BAPC's which are utilized in the pelletization in the practice of this invention. It will be recalled that such BAPC's are described hereinabove with reference to formula (I).

Producing Pellets of this Invention by Forming a Flowing Melt from a Feed of Solids A variety of pelletizing equipment can be employed in forming the pellets of this invention. For example, the molten blends of BAPC's can be pelletized by producing a flowing melt in a suitable high shear, elevated temperature, continuous melt mixing device such as a single screw extruder, a twin screw extruder, a gear extruder, a disc extruder, or a roll mill extruder and forcing the flowing melt through the orifice(s) of a die which produces at least one strand, and preferably a plurality of strands, of the melt, followed by conversion of the strand(s) into pellets by use of a chopper, an air knife system, or other form of pelletizer, such as Reduction Engineering's Conair strand pelletizer 300 series, Killion strand pelletizer, Brabender strand pelletizer, Rieter/Automatik pelletizer, and Ikegai or Cumberland strand pelletizers.

While other equipment can be utilized, one efficient and effective way of forming the pellets pursuant to this invention comprises forming the flowing melt at an elevated temperature in a twin-screw extruder being operated under relatively mild operating conditions. The extrudate from the extruder is pelletized before or after the extrudate solidifies by itself or is solidified by means of some appropriate method of cooling the melt, such as by passage into a cooling liquid such as water, contact with a chilled surface such as a chilled metallic conveyor belt, or use of a cooling gas such as refrigerated air or nitrogen.

One of the efficacious ways of effecting the conversion of the binder-free extrudates into pellet form is a method which comprises:

forming at least one strand of molten BAPC, e.g., by passing the flowing melt in the extruder through a die disposed at the outlet end of the extruder, which die preferably has multiple orifices so that multiple strands of molten BAPC are formed;

submitting such strand(s) to cooling and downwardly directed forced air flow on a porous conveyor belt whereby such strand(s) break into pellets; and causing such pellets to drop into a classifier that removes fines from the pellets.

As noted above, the pellets of this invention, if properly made, form only small amounts of fines during the drop into the classifier.

Producing Pellets of this Invention by Forming a Flowing Melt from a Feed of a Solution or Slurry Another efficacious method for producing pellets of this invention pursuant to this invention is a method in which the conversion of a solution or slurry of BAPC into a flowing melt is conducted at an elevated temperature in an operating devol extruder, and in which the extrudate from the devol extruder is pelletized before or after the extrudate solidifies or is solidified. In conducting such a process in which a flowing melt is formed in a devol extruder, the solvent used in forming the solution or slurry is concurrently vaporized, and preferably recovered for recycle. The solution or slurry introduced into the devol extruder should be sufficiently concentrated so that it can be of extrudable viscosity. Typically, such solution or slurry will contain in the range of about 40 to about 80 wt % of BAPC, based on the total weight of the solution or slurry.

The conversion of the extrudate into solidified pellets by such process technology is characterized in that during pellet formation, pellet handling, and pellet usage, the pellets are not accompanied by, or result in formation of, unacceptable quantities of air-entrainable dusts, even though some smaller granules may be formed.

Accordingly, this efficacious method of forming the pellets of this invention wherein a devol extruder is utilized is a method which comprises:

converting an admixture of extrudable viscosity comprising a solution or slurry of BAPC in a vaporizable solvent, into a flowing melt in a devol extruder that is adapted and operated (i) to separate in the devol extruder vaporizable solvent from the solution or slurry and/or from a flowing melt formed from such solution or slurry, and (ii) to form as extrudate a polymer melt or polymer flow;

having the extrudate pass through a die to thereby form one or more traveling strands of molten BAPC; and pelletizing such strand(s) by enabling and/or causing such traveling strand(s) to solidify and be broken, subdivided, or otherwise converted into pellets of the BAPC; and subjecting the pellets to size classification to remove and recover from such product (a) oversized particles, if any, and (b) fines, if any, that may be present in such product. Desirably, the solvent that is separated during the operation is recovered for recycle in the overall operation.

The solvents used in forming the solutions or slurries of BAPC for use with a devol extruder can be any liquid solvent that is capable of being vaporized at a temperature below that at which the components present in the solution or slurry would begin to undergo thermal degradation, and that does not adversely react with any component of the solution or slurry whether or not in the solution or slurry. Typically, the solvent is composed of one or more halogenated solvents that have boiling temperatures below about 150° C. at atmospheric pressures. Typical halogenated solvents are those in which each halogen atom is a bromine atom or a chlorine atom or in which the solvent contains at least one bromine atom and at least one chlorine atom. Less preferred are solvents containing one or more halogen atoms other than bromine atoms and/or chlorine atoms. The term "vaporizable" simply means that the solvent should boil at a temperature below that at which the particular mixture of components in the initial solution or slurry would begin to undergo an unacceptable amount of thermal degradation. This temperature will of course vary from case to case depending upon such factors as the identity and thermal characteristics of the various components present in the solution or slurry, the length of time, if any, that the solution or slurry is at a threshold decomposition temperature, and the quality control specifications imposed upon the composition of the finished pellets of this invention. Non-limiting examples of suitable organic solvents include dichloromethane, dibromomethane, bromochloromethane, bromotri-chloromethane, chloroform, carbon tetrachloride, 1,2-dibromoethane, 1,1-dibromoethane, 1-bromo-2-chloroethane, 1,2-dichloroethane, 1,2-dibromopropane, 1-bromo-3-chloropropane, 1-bromobutane, 2-bromobutane, 2-bromo-2-methylpropane, 1-bromopentane, 1-bromo-2-methyl-butane, 1-bromohexane, 1-bromoheptane, bromocyclohexane, and liquid isomers, homologs, or analogs thereof. Liquid mixtures of two or more such compounds can be used. Bromo-chloromethane is a particularly desirable solvent because of its availability, relatively low cost, and desirable solvency and vaporization characteristics. If a solvent exchange procedure is used, such halogenated solvent can be replaced for example by a vaporizable liquid aromatic hydrocarbon solvent.

Pellets of the Invention

The pellets of this invention as produced can be of various sizes and shapes. Typically, they are in a size range of about 3/8-inch to about 20 standard U.S. mesh size and which, as produced, contain only small amount of particles of smaller size (e.g., no more than about 5 wt %). The amount of particles in the dust size range (i.e., in the range of about 20 to about 840 microns) is typically no more than about 5 wt %.

The following Examples illustrate the preparation of the APC's, the bromination of APC's to form BAPC's, the pelletization of the BAPC and test work showing the dust free characteristics of the pellets of this invention. These Examples are given for purposes of illustration and are not intended to impose limits upon the generic scope of the invention.

EXAMPLE 1

Preparation of an APC, a Substrate for Bromination

In this operation, fresh toluene as well as other fresh reactants were used. A glass-lined, 100-gallon jacketed reactor equipped with an overhead condenser, submerged thermal well/thermal couple and a bottom drain valve. Temperature was maintained at a set point by controlling the temperature of the water flowing through the jacket using a steam control valve. Vigorous agitation was accomplished by means of a three-blade, retreat-curve agitator on a variable speed drive. The reactor is essentially free of all wetted PTFE parts or other polymeric fluorinated materials or elastomers.

The reactor was maintained under an inert dry $N_2$ atmosphere during all operations. The reactor was charged with the chain transfer agent(s) through a dip leg by means of pressure transfer from a portable tank. Alkyl lithium, additional solvents and the amine promoter (TMEDA) were all fed subsurface to the stirred chain transfer agent(s) through the same dip leg. Styrene was pressure transferred from a portable, pressure vessel by means of a metering valve through a 24" cylindrical column (3" dia.≈6 lbs.) of 3 Å mol sieves (Zeochem) and delivered as a fine stream or spray above the surface of the reaction mixture through a slit feed nozzle.

Toluene 140 pounds, (689 mol) was charged to the reactor; Karl Fischer moisture analysis indicated 7 ppm residual $H_2O$. Agitation began. The solvent was heated to 78° C. by applying tempered water to the vessel jacket. Upon reaching the set point temperature, 4.6 pounds of TMEDA (18.0 mol), in 10 pounds of toluene (49.24 mol) was charged to the reactor through the dip leg below the surface of the agitated toluene reaction mixture. The feed line was then flushed with 20 pounds (98 mol) of anhydrous toluene. Next, 4.4 lb n-BuLi solution (23.5 wt % in cyclohexane) (7.32 mol n-BuLi) was charged through the subsurface feed line forming the characteristic bright red-orange color of TMEDA complexed benzyl lithium anion with concomitant off gassing of butane. The feed line was then flushed with 22 pounds (108 mol) of anhydrous toluene. 436 lb of styrene (99+%, 1899 mol, American Styrenics) were fed over 153 minutes. The styrene was added by means of pressure transfer from a nitrogen regulated portable tank through a metering valve at a constant feed rate of 2.84 lb/min. The reactor was allowed to ride for 5 minutes to make certain the reaction was complete.

The reaction mixture was quenched at 70° C. with 10 gallons of 0.75 wt % ammonium chloride solution which had been deoxygenated overnight by sparging with nitrogen gas. The reaction mixture was washed two more times with 10 gallons of deoxygenated water. Phase cuts were rapid and required little settling time. Water and any rag or emulsion was removed through the bottom drain valve. A sample of the washed crude reaction mixture was analyzed by GPC ($M_p$: 312, $M_n$: 466, $M_w$: 673, $M_z$: 934, polydispersity (PD): 1.44).

The reactor was heated to atmospheric boiling point using tempered water on the vessel jacket. Steam was then applied to the reactor jacket to increase the temperature of the reactor jacket to 140° C. Cyclohexane, residual moisture and toluene boiled, condensed in the overhead condenser, and drained to a drum until a pot temperature of 135° C. was observed. The reactor was cooled to 50° C. Vacuum was applied to the vessel and the reactor was heated to boiling point. Steam was then applied to the reactor jacket to increase the temperature of the reactor jacket to 140° C. Vacuum was used to decrease the reactor pressure to 35 mm Hg. Cyclohexane, residual moisture and toluene boiled, condensed in the overhead condenser, and drained to a drum until a pot temperature of 135°

C. was observed. An aliquot was removed from the reactor for analysis via GPC ($M_p$: 314, $M_n$: 468, $M_w$: 676, $M_z$: 940, polydispersity (PD): 1.44). The reaction mass (557 lbs) was collected in a 350-gallon tote bin.

EXAMPLE 2

Partial Use of Recycled Toluene to Form Crude APC, a Precursor Material for WFE Treatment In this Example, a portion of a composite composed predominately of toluene, TMEDA, cyclohexane, and 1,3-diphenylpropane recovered from prior runs was used. Thus, this Example demonstrates use of recycled toluene as part of the total toluene charged.

Fresh toluene 40 pounds, (197 mol) and 97 lb of recycled toluene (containing 97.1%, 94.2 lb, 464 mol toluene; 1.7%, 1.6 lb, 6.2 mol TMEDA; 0.3%, 0.3 lb, 0.7 mol, 1,3-diphenlypropane; 0.9%, 0.9 lb, 4.9 mol cyclohexane) was charged to the reactor; Karl Fischer moisture analysis indicated 7 ppm residual $H_2O$. Agitation began. The solvent was heated to 79° C. by applying tempered water to the vessel jacket. Upon reaching the set point temperature, 3.6 pounds of fresh make-up TMEDA (12.8 mol), in 10 pounds of toluene (49.24 mol) was charged to the reactor through the dip leg below the surface of the agitated toluene reaction mixture. The feed line was then flushed with 20 pounds (99 mol) of anhydrous toluene. Next, 4.4 lb n-BuLi solution (23.6 wt % in cyclohexane) (7.4 mol n-BuLi) was charged through the subsurface feed line forming the characteristic bright red-orange color of TMEDA complexed benzyl lithium anion with concomitant off gassing of butane. The feed line was then flushed with 22 pounds (108 mol) of anhydrous toluene. 432 lb of styrene (99+%, 1881 mol, American Styrenics) were fed over 150 minutes. The styrene was added by means of pressure transfer from a nitrogen regulated portable tank through a metering valve at a constant feed rate of 2.88 lb/min. The reactor was allowed to ride for 5 minutes to make certain the reaction was complete.

The reaction mixture was quenched at 70° C. with 10 gallons of 0.75 wt % ammonium chloride solution which had been deoxygenated overnight. The reaction mixture was washed with a second 10 gallons of deoxygenated water. Phase cuts were rapid and required little settling time. Water and any rag or emulsion was removed through the bottom drain valve. A sample of the washed crude reaction mixture was analyzed by GPC ($M_p$: 303, $M_n$: 462, $M_w$: 677, $M_z$: 959, PD: 1.47).

The reactor was heated to atmospheric boiling point using tempered water on the vessel jacket. Steam was then applied to the reactor jacket to increase the temperature of the reactor jacket to 140° C. Cyclohexane, residual moisture and toluene boiled, condensed in the overhead condenser, and drained to a drum until a pot temperature of 135° C. was observed. The reactor was cooled to 50° C. Vacuum was applied to the vessel and the reactor was heated to boiling point. Steam was then applied to the reactor jacket to increase the temperature of the reactor jacket to 140° C. Vacuum was used to decrease the reactor pressure to 35 mm Hg. Cyclohexane, residual moisture and toluene boiled, condensed in the overhead condenser, and drained to a drum until a pot temperature of 135° C. was observed. An aliquot was removed from the reactor for analysis via GPC ($M_p$: 301, $M_n$: 459, $M_w$: 672, $M_z$: 950, PD: 1.46). The reaction mass (544 lbs) was collected in a 350-gallon tote bin.

EXAMPLE 3

Blending of Crude APC Batches and WFE Purification of the Blend to Form APC

A total of 12 all fresh runs were made following the general procedure of Example 1 above with the $M_n$ after the vacuum strip ranging from 403 to 483 and an $M_w$ ranging from 566 to 721. A total of 13 recycled toluene runs were made following the general procedure of Example 2 above with the $M_n$ after the vacuum strip ranging from 404 to 463 and an $M_w$ ranging from 568 to 688. Possible causes of these ranges are small variations in the temperature, stirring speed or feed rate. The 12 all fresh runs were combined with the 13 recycle runs and run through an industrial size wiped film evaporator (WFE), a sample was analyzed by GPC: ($M_p$: 413, $M_n$: 552, $M_w$: 693, $M_z$: 878, PD: 1.26). A five-gallon sample of the composite was stripped in the laboratory giving a very similar result: ($M_p$: 418, $M_n$: 569, $M_w$: 729, $M_z$: 946, PD: 1.28).

EXAMPLE 4

Preparation of BAPC Solutions

Two batches of APC's formed as in Example 3 in the form of solutions in BCM were individually brominated in a 50-gallon glass-lined, jacketed vessel capable of using ethylene glycol for heat exchange (heating or cooling) or steam for heating. The reactor was equipped with a pitched-blade glass-lined agitator with a nitrogen seal. Both batch reactions had a target reaction feed time of about 3 hours, a target reaction temperature between −2 to 2° C. with a targeted final bromine concentration of 74±0.5 wt %. The bromination reaction involved separately and concurrently feeding bromine and the APC over a three hour period. The ratio of the APC to bromine was held constant and closely monitored throughout the reaction to create a final product with a specified bromine concentration. After feeding was complete, the reaction mass was held in the reactor for 45 minutes while the temperature was brought up to ~6° C. Any excess bromine in the reaction mass was quenched with water. This was followed by a water wash, and then another wash using a caustic and sodium borohydride solution at ~60° C. to neutralize remaining HBr. The presence of sodium borohydride in the wash solution is deemed to break down aminic compounds present in the reaction mass that can form color bodies in the final isolated product. The reaction mass is finally washed again with water to a neutral pH.

Bromine was fed via pressure transfer from a stainless steel 5-gallon milkcan lined with Teflon® PFA resin (a perfluoroalkoxy copolymer resin; DuPont), the resin being hereinafter referred to as PFA. The milkcan used is 9" ID, 14" tall without the liner, with a 0.22" thick lining around the entire internal surface area of the can. Including the lining, the actual fill volume of the can is ~4.6 gallons. The can is equipped with a ⅜" PFA dipleg, and 3 additional ½" ports that were used for nitrogen pressure, a PSD with holder, and venting down. A 2" center port on the can had a PFA plug secured with a Nitronic 60 nut.

There were two feed diplegs used in these reactions. The first dipleg is a solid pipe of Teflon® fluoropolymer, with 2×¼" holes drilled through the entire length of the pipe. There is ¼" PFA tubing run from top to bottom of each of the void spaces, which are spread ¾" apart. The tubing is secured in place at each end with drilled-through pipe-to-tubing male connectors and PFA nuts/ferrules. The other dipleg is similar in shape, but has ⅜" drilled through fittings on the top flange, with 2×⅜" tubing runs extending through the void space of a hollow pipe of Teflon fluoropolymer. The tubing connects ~20 inches down via PFA fittings to the top of a solid mixing nozzle made of Teflon fluoropolymer. This nozzle is screwed into threads on the inside of the pipe of Teflon polymer, and impinges the two feeds before they enter the reactor through a ⅛" hole at the bottom of the nozzle. Both diplegs are ~24" in length from the bottom flange of the dipleg, and extend into the reactor approximately 2" above the tip of the agitator blades.

Catalyst was introduced to the reactor through a charge bomb composed of a 1" stainless steel (SS) block valve, a 1×1½" SS reducer, and a 1½" full port SS-lined brass block valve. The catalyst charge to the bomb was performed in a $N_2$ purged glove box, through the 1.5" full port valve. Following the charge, a ½" SS tee was fitted to the top of the 1.5" valve to attach a pressure gauge and to charge $N_2$ to the bomb. The entire setup screwed onto a reducing flange on a reactor nozzle via the 1" block valve.

Aqueous phase cuts were all conducted using a PFA dipleg. It was a length of ½" PFA tubing that was straightened out, and grooved at the end to hold PFA ferrules in place. The ferrules allowed for the tubing to be pushed down and lowered into the reactor for decanting the aqueous phase, but prevented the tubing from coming out of the reactor beyond the drilled through PFA fitting and cap that held the tubing in place. The dipleg tubing ran from the reactor, straight to a box made from Plexiglas® resin that was used for sampling the aqueous material during cuts. There were deliberately no fittings between the dipleg nozzle at the reactor and this sample point to lower the risk of aqueous exposure related to additional points of failure present in the line.

The BCM product solutions from Batch Numbers 1 and 2 were combined into a single BCM solution.

Table 1 summarizes for each of batch brominations No. 1 and No. 2 the reaction conditions used, the components and amounts thereof used, the analytical results on the products and calculations based thereon, and the properties and composition of two smaller sample batches of isolated BAPC solids.

TABLE 1

|  | BATCH NO. 1 | BATCH NO. 2 |
|---|---|---|
| REACTION CONDITIONS | | |
| Feed Time, min | 176 | 186 |
| Reaction Temperature Range (20 minutes to end) | 0.8/−2.2 | 1/−1.5 |
| Average Reaction Temperature | −0.76 | −0.68 |
| CHARGES | | |
| AlCl$_3$, lb | 0.30 | 0.30 |
| BCM, heel, lbs | 290 | 290.2 |
| Bromine Feed, lbs | 103.9 | 105.4 |
| APC Feed, lbs | 72.7 | 75.6 |
| APC Feed, wt % in BCM | 26.7 | 25.3 |
| NaBH$_4$ Solution, lbs | 61.2 | 98.3 |
| Water Wash, lbs | 95 | 95 |
| Product Download in BCM, lbs | 392.4 | 404.9 |
| ANALYTICAL RESULTS | | |
| Bromine, wt % | 73.7 | 74.4 |
| BAPC in BCM, wt % | 18.4 | 18.7 |
| CALCULATIONS | | |
| AlCl$_3$:Br$_2$ (mole/mole %) | 0.343 | 0.338 |
| Br$_2$:APC, lb/lb | 5.3 | 5.5 |
| NaBH$_4$:BAPC (neat) lb/lb | 0.85 | 1.43 |
| BAPC Product Formed, lbs (theoretical) | 73.9 | 74.7 |
| BAPC Product Formed, lbs (actual) | 72.2 | 75.7 |
| Yield | 97.7% | 101.3% |
| SOLIDS FROM SAMPLE WORKUP | | |
| Bromine, wt % | 73.6 | 74.4 |
| Thermal Color, 250° C. for 15 minutes | 10.15 | 11.35 |
| Thermal Color, 300° C. for 20 minutes | 19.93 | 20.48 |
| Thermal HBr at 300° C., ppm | 198 | 139 |

EXAMPLE 5

Preparation of Pellets from BAPC

The BCM solution of the two batches BAPC formed in Example 4 was used as feed to a devol extruder utilizing a processing equipment setup as schematically depicted and described in FIGS. 2 and 3 of WO 2008/011477, published Jan. 24, 2008. Both of said figures and the description thereof in WO 2008/011477 are incorporated herein by reference. The major difference between the present operation of the devol extruder system and that described in WO 2008/011477 is that instead of converting solutions of brominated styrenic polymers and brominated anionic styrenic polymers into pellet or granular form, the combined BAPC solution in BCM formed in Example 13 was concentrated to a 60 wt % solution and used as the feed to the devol extruder. Other small differences in operating conditions of the devol extruder as compared to the operations described in WO 2008/011477 are referred to herein. Thus, in the present operation the rate of feed of the solution to the devol extruder was initially 35 to 40 lbs/hr and as the operation proceeded, this rate was gradually increased up to about 63 lbs/hr. At this point with the twin screws operating at 250 rpm, a torque of 23%, a melt temperature of 336° F. (169° C.), and a head pressure of 115 lbs, collection of pellets or granules in the system was initiated. The zone temperatures in the devol extruder were as follows Zones 1 & 2 were at 225° F.; Zones 3 & 4 were at 275° F.; Zones 5 & 6 were at 325° F.; Zones 7 & 8 were at 375° F.; and Zones 9 & 10 were at 365° F. The die temperature was also at 365° F. After 50 minutes of operation the temperature of Zones 9 & 10 and the die were lowered to 350° F. The operation was completed after a few hours. Surprisingly, despite the fact that the BAPC had a much lower $M_w$ than that of typical brominated anionic styrenic polymer (ca. 3000 for BAPC, ca. 13,000 for typical brominated anionic styrenic polymer), pellets of good quality were formed in this operation.

Pellets formed in Example 5 were evaluated for their ability to withstand formation of fines and dust by a test method which will now be described with reference to FIGS. 1A through 1D. For reference purposes the test is called the Tumbling Attrition Test.

The Tumbling Attrition Test

Figures 1A, 1B, 1C, 1D:
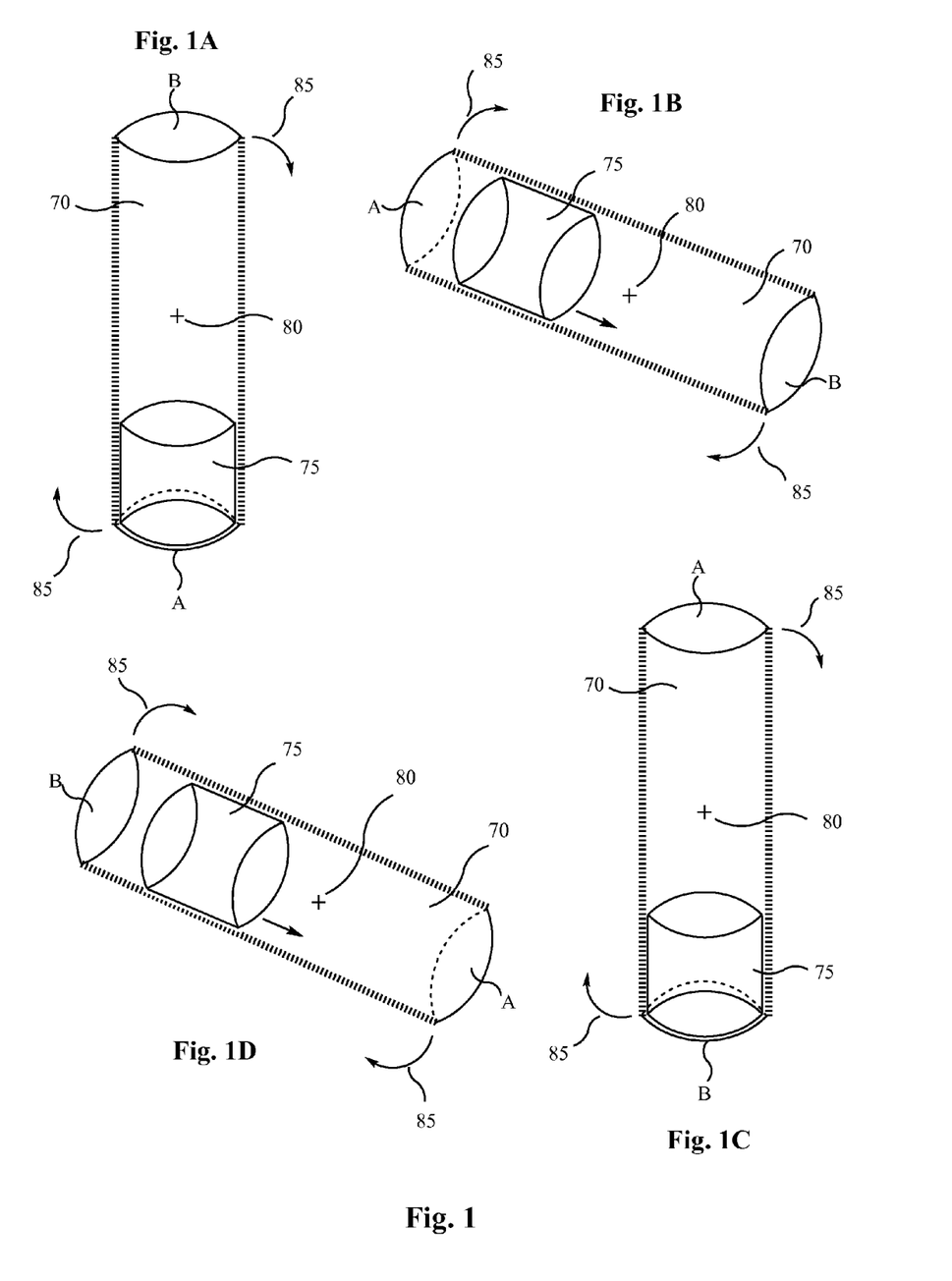
FIGS. 1A through 1D illustrate the manner of conducting the Tumbling Attrition Test for determining fines, if any, formed from pellets of this invention.

In essence, the test involves rotation of a hollow cylinder closed at each end containing a bottle or jar sized to freely slide from end to end within the closed space within the cylinder. The cylinder is positioned so that it can be rotated around its imaginary horizontal axis. Rotation of the cylinder on this axis causes the enclosed bottle or jar to slide to and fro within the cylinder whereby it alternatively impacts one or the other of the closed ends of the cylinder. This enables determination of the extent, if any, to which fine particles are formed by these impacts during a specified period of time. Thus, referring to FIGS. 1A-1D in which like parts have like numerals, a fillable bottle or jar 75 made of plastic and having a height of 5 inches, an outer diameter of 2 inches and a capacity of 250 mL is filled with 200 grams of pellets to be evaluated. Typically this amount of pellets fills about one-half of the bottle or jar. The bottle or jar 75 is then tightly closed and placed inside a hollow cylinder 70 which has a length of 15 inches and an inner diameter of slightly greater than 2 inches. The cylinder is then closed at end A and B thereby providing an enclosed space in which bottle or jar 75 can slide from end to end. Cylinder 70 is positioned so that it can be rotated in a vertical plane about axis 80 such as indicated by arrows 85. As shown by FIG. 1B, as the cylinder is rotated about axis 80 by more than 90 degrees, bottle or jar 75 commences to slide from closed end A toward closed end B of cylinder 70. As shown by FIG. 1C, upon reaching about 180 degrees of rotation, bottle or jar 75 has impacted the closed end B of cylinder 70. After passing 275 degrees of rotation, bottle or jar 75 begins sliding away from closed end B toward closed end A. As indicated in FIG. 1D, upon 360 degrees of rotation, bottle or jar 75 has impacted against closed end A of cylinder 70. Cylinder 70 is rotated at a constant rate of 15 rpm for 3 minutes. This causes the pellets within closed bottle or jar 75 to be agitated and subjected to an impact upon each 180 degrees of rotation. At the end of the 3 minute period, the rotation is stopped and the contents of the bottle or jar are sieved on a 20-mesh U.S. Standard sieve screen (0.033" openings). The fines which passed through the screen and are collected, and are then analyzed for particle size distribution and the mass of such fines is determined. This in turn enables calculation of the weight percentage of total fines formed during the test from the starting quantity of the pellets. It can thus be seen that the operation of the test in this manner enables the determination of the extent to which the pellets have undergone attrition with formation of fines during the test.

EXAMPLE 6

Evaluation of Pellets of this Invention as Regards Minimization of Fines and Dusts A test quantity of pellets from the batch of pellets formed in Example 5 were obtained and subjected to the Tumbling Attrition Test as described above. For reference purposes, a similar test was conducted on pelletized brominated anionic styrenic polymer (i.e., a brominated polymer where the polymer used was produced using anionic initiation). The results of these evaluations are summarized in Table 2. In Table 2 "BASP" denotes brominated anionic styrenic polymer.

TABLE 2

| Pellet Composition, wt % | Total Weight, g | Total Fines After Tumbling Attrition Test, g | Total Fines After Tumbling Attrition Test, wt % |
|---|---|---|---|
| 100% BASP | 200 | 14.26 | 6.9 |
| 100% BAPC | 200 | 8.47 | 4.2 |

Table 3 summarizes particle size distribution data obtained on the fines obtained after the tumbling tests referred to in Table 2.

TABLE 3

| Pellet Composition | Avg. Particle Size, microns | Microns | | | | | Range |
| | | 90% | 75% | 50% | 25% | 10% | |
|---|---|---|---|---|---|---|---|
| 100% BASP | 826 | 1495 | 1167 | 857 | 377 | 91 | 0.195-2000 |
| 100% BAPC | 93 | 174 | 140 | 90 | 43 | 13 | 0.496-256.9 |

Analytical Methods

Except for thermal color analysis, applicable analytical methods for assaying properties of APC's and BAPC's are set forth in International Publication Number WO 2008/154453 A1 having an International Publication Date of 18 Dec. 2008. The procedure for thermal color analysis is as follows: A custom made metal heating block from J-Kem Scientific (St. Louis, Mo.) featuring 12 heating ports with diameters to snuggly fit 20 ml flat bottom scintillation vials is used. The heating block is placed in a in a nitrogen-purged glove box and heated to the test temperature (either 250 or 300° C.). Duplicate 5-gram samples of the BAPC powder are placed in 20 ml scintillation vials to be heat treated in the heating block. The material in the vials are heated for the specified time (15 minutes at 250° C. or 20 minutes at 300° C.). Upon completion of the heat treatment or thermal aging period, the samples are immediately removed from the block and cooled under nitrogen. The samples are dissolved to make a 10 wt % solution in chlorobenzene. The solution color is of the dissolved sample in terms of L, a, b and Delta E is measured and compared to a chlorobenzene blank standard (L=100, a=0, b=0) using a Hunter Lab Color Quest XE Colorimeter (Reston, Va.).

The invention may comprise, consist, or consist essentially of the materials and/or procedures recited herein.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text expressly indicates otherwise.

Each and every patent or publication referred to in any portion of this specification is incorporated in tow into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

The invention claimed is:

1. A process for pelletizing a brominated aromatic polymer composition of the formula:

wherein n is an average number in the range of about 2.9 to about 3.9, wherein each x is the same or different and is a whole number in the range of 3 to 5, the average number of all of the x's in the composition being in the range of about 3.50 to about 3.80 and the weight percent of bromine as determined by X-Ray Fluorescence Spectroscopy in the polymer being in the range of about 73.4 to about 74.5, which process comprises forming a flowing melt consisting of a melt of a brominated aromatic polymer composition of the above formula; and either forcing said flowing melt through one or more orifices of a die which produces one or a plurality of strands, and
      converting said strands into solidified pellets; or
      when said flowing melt is in a devolatilization extruder, forming an extrudate, and
      converting said extrudate into pellets, wherein, during the process of pelletization, formation of finely-divided particles and of air-entrainable dust is less than about 5 wt %.

2. A process as in claim 1 wherein the conversion of said brominated aromatic polymer composition into a flowing melt is conducted at an elevated temperature in an operating twin screw extruder, and wherein the extrudate from the extruder is pelletized before or after the extrudate solidifies or is solidified.

3. A process as in claim 1 wherein the conversion of said brominated aromatic polymer composition into a flowing melt is conducted at an elevated temperature in an operating devol extruder, and wherein the extrudate from the devol extruder is pelletized before or after the extrudate solidifies or is solidified.

4. A binder-free pelletized flame retardant composition in which the pellets are formed from a composition consisting of a brominated aromatic polymer composition of the formula:

wherein n is an average number in the range of about 2.9 to about 3.9, wherein each x is the same or different and is a whole number in the range of 3 to 5, the average number of all of the x's in the composition being in the range of about 3.50 to about 3.80 and the weight percent of bromine as determined by X-Ray Fluorescence Spectroscopy in the polymer being in the range of about 73.4 to about 74.5, and wherein the pellets if breakup occurs during handling or use, smaller granules are formed and co-formation of air-entrainable dusts is less than about 5 wt %.

5. A composition as in claim 4 in which the pellets optionally contain brominated toluene in an amount in the range of about 400 ppm (wt/wt) to below the detection limit of about 20 ppm (wt/wt), and of brominated 1,3-diphenylpropane, typically in the range of about 0.2 to about 1.0 wt %.

6. Pellets formed as in claim 1, said pellets being further characterized in that if and when subjected to the Tumbling Attrition Test, the amount of finely divided particles capable of passing through a 20-mesh U.S. Standard sieve screen is 5 wt % or less.

7. Pellets as in claim 6 wherein said amount of finely divided particles capable of passing through a 20-mesh U.S. Standard sieve screen is 4.5 wt % or less.

* * * * *